US012567639B2

(12) United States Patent (10) Patent No.: US 12,567,639 B2
Luo (45) Date of Patent: Mar. 3, 2026

(54) BOX, BATTERY, ELECTRICAL APPARATUS, AND METHOD AND APPARATUS FOR PREPARING BATTERY

(71) Applicant: CONTEMPORARY AMPEREX TECHNOLOGY (HONG KONG) LIMITED, Hong Kong (CN)

(72) Inventor: Wenchao Luo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 183 days.

(21) Appl. No.: 18/672,012

(22) Filed: May 23, 2024

(65) Prior Publication Data

US 2024/0313330 A1 Sep. 19, 2024

Related U.S. Application Data

(63) Continuation of application No. PCT/CN2023/070775, filed on Jan. 5, 2023.

(30) Foreign Application Priority Data

Jan. 13, 2022 (CN) .......................... 202210038777.1

(51) Int. Cl.
*H01M 50/262* (2021.01)
*H01M 10/04* (2006.01)
(Continued)

(52) U.S. Cl.
CPC ..... *H01M 50/262* (2021.01); *H01M 10/0404* (2013.01); *H01M 10/613* (2015.04);
(Continued)

(58) Field of Classification Search
CPC ........... H01M 50/262; H01M 10/0404; H01M 10/613; H01M 10/625; H01M 10/656;
(Continued)

(56) References Cited

U.S. PATENT DOCUMENTS 7,131,807 B1 11/2006 Babej
2010/0273034 A1 10/2010 Hermann et al.
2017/0373361 A1* 12/2017 Kosaki .............. H01M 10/6562

FOREIGN PATENT DOCUMENTS

CN 104421287 A 3/2015
CN 106972128 A 7/2017
(Continued)

OTHER PUBLICATIONS

The extended European search report received in the counterpart European application 23739891.2, mailed on Feb. 10, 2025.
(Continued)

*Primary Examiner* — Matthew T Martin
*Assistant Examiner* — Bartholomew A Hornsby
(74) *Attorney, Agent, or Firm* — K&L Gates LLP

(57) ABSTRACT

Embodiments of the present application provide a box, a battery, an electrical apparatus, and a method and an apparatus for preparing a battery. The box (10) includes a box body for accommodating a plurality of battery cells; a fixing member fixedly connected to the box body; and a thermal management component provided with a fitting hole for guiding the fixing member to penetrate through the thermal management component, the thermal management component being used for adjusting temperatures of the plurality of battery cells; wherein the fixing member is configured to penetrate through the fitting hole and bend toward the periphery of the fitting hole, so as to fix the thermal management component to the box body. The box, the battery, the electrical apparatus, and the method and apparatus for preparing a battery in the embodiments of the present application are capable of improving the safety performance of the battery.

12 Claims, 8 Drawing Sheets

120

120

(51) Int. Cl.

| | |
|---|---|
| *H01M 10/613* | (2014.01) |
| *H01M 10/625* | (2014.01) |
| *H01M 10/656* | (2014.01) |
| *H01M 50/209* | (2021.01) |

(52) U.S. Cl.
CPC ....... *H01M 10/625* (2015.04); *H01M 10/656* (2015.04); *H01M 50/209* (2021.01); *H01M 2220/20* (2013.01)

(58) Field of Classification Search
CPC .......... H01M 50/209; H01M 2220/20; H01M 10/653; H01M 10/6554; H01M 10/6556; H01M 50/249; H01M 50/291; H01M 50/244; H01M 10/63; H01M 50/204; H01M 50/289; Y02E 60/10
See application file for complete search history.

(56) References Cited

FOREIGN PATENT DOCUMENTS

| | | | |
|---|---|---|---|
| CN | 209447945 | U | 9/2019 |
| CN | 111261819 | A | 6/2020 |
| DE | 102008034888 | A1 | 1/2010 |
| DE | 102010012993 | A1 | 9/2011 |
| DE | 202012012752 | U1 | 1/2014 |
| DE | 102013219562 | A1 | 4/2014 |
| DE | 102018116271 | A1 | 1/2019 |
| DE | 102020003186 | A1 | 12/2021 |
| EP | 3675207 | A1 | 7/2020 |
| GB | 2593187 | A | 9/2021 |
| JP | 2011175743 | A | 9/2011 |
| JP | 2013242979 | A | 12/2013 |
| JP | 2019106313 | A | 6/2019 |
| JP | 2020145067 | A | 9/2020 |
| JP | 2021521619 | A | 8/2021 |
| WO | 2014128841 | A1 | 8/2014 |

OTHER PUBLICATIONS

International Search Report received in the corresponding international application PCT/CN2023/07077 5, mailed Mar. 17, 2023.

The Notice of Reasons for Refusal received in the counterpart JP application 2024-518171, mailed on May 1, 2025, 10 pages with English translation.

Office Action (with English Machine Translation), mailed Nov. 13, 2025, for corresponding Chinese Patent Application Serial No. 202210038777.1.

* cited by examiner

1

120

121

120

122

10

<u>100</u>

300

S320

BOX, BATTERY, ELECTRICAL APPARATUS, AND METHOD AND APPARATUS FOR PREPARING BATTERY

CROSS-REFERENCE TO RELATED APPLICATION

The present application is continuation of International Application No. PCT/CN2023/070775, filed Jan. 5, 2023, which claims the priority of Chinese Patent Application No. 202210038777.1 filed on Jan. 13, 2022 and entitled "BOX, BATTERY, ELECTRICAL APPARATUS, AND METHOD AND APPARATUS FOR PREPARING BATTERY", which is incorporated herein by reference in its entirety.

TECHNICAL FIELD

The present application relates to the technical field of batteries, and in particular, to a box, a battery, an electrical apparatus, and a method and an apparatus for preparing battery.

BACKGROUND

Energy conservation and emission reduction are the key to the sustainable development of the automobile industry. In this case, due to the advantages of energy conservation and environment protection, electric vehicles have become an important part of the sustainable development of the automobile industry. For electric vehicles, battery technology is an important factor related to their development.

In the development of the battery technology, in addition to improving the performance of batteries, safety is also an issue that cannot be ignored. If the safety of the battery cannot be guaranteed, the battery cannot be used. Therefore, how to enhance the safety performance of the batteries is an urgent technical problem to be solved in the battery technology.

SUMMARY OF THE INVENTION

The present application provides a box, a battery, an electrical apparatus, and a method and an apparatus for preparing a battery, so as to be capable of improving the safety performance of the battery.

In a first aspect, a box is provided, including a box body for accommodating a plurality of battery cells; a fixing member fixedly connected to the box body; and a thermal management component provided with a fitting hole for guiding the fixing member to penetrate through the thermal management component, the thermal management component being used for adjusting temperatures of the plurality of battery cells; wherein the fixing member is configured to penetrate through the fitting hole and bend toward the periphery of the fitting hole, so as to fix the thermal management component to the box body.

In the embodiment, by introducing the thermal management component, the temperature of the battery cell can be adjusted, so that the temperature of the battery cell can be reduced in time when a high-temperature and high-pressure emission is released inside the battery cell, thereby enhancing the safety performance of the battery.

In addition, by simply deforming the structure of the fixing member, the thermal management component can be fixed to the box body. The fixing method is simple and easy to implement, and does not damage the surface treatment of the thermal management component, thereby avoiding corrosion of the thermal management component, and further enhancing the safety performance of the battery.

In a possible embodiment, the fixing member is configured to be capable of being crimped to form a blocking portion on the periphery of the fitting hole, and the blocking portion is used for fixing the thermal management component to the box body.

In the embodiment, the blocking portion is formed by crimping the fixing member, so that the thermal management component is defined between the blocking portion and a wall of the box body, and the existence of the blocking portion is capable of limiting the movement of the thermal management component in a direction away from one wall of the box body, so that the thermal management component is capable of being fixed on the box body.

In a possible embodiment, before the fixing member is crimped, the diameter of the fixing member gradually becomes larger in a direction away from a connection between the fixing member and the box body.

In the embodiment, before the fixing member is crimped, an opening of the fixing member is in the shape of a bell mouth, which is more conducive to the crimping process of the fixing member, and the blocking portion formed after crimping is capable of better fixing the thermal management component on the box body.

In a possible embodiment, the fixing member is fixed to a first wall of the box body, the first wall is parallel to the thermal management component, and the fixing member is used for fixing the thermal management component to the first wall.

In the embodiment, the thermal management component is fixed on the first wall of the box body parallel to the thermal management component, which is capable of reducing modifications to the thermal management component and is capable of reducing the assembling complexity of the thermal management component.

In a possible embodiment, the thermal management component is further bonded to the first wall through a structural adhesive.

In the embodiment, on the basis of fixing the thermal management component to the first wall through the fixing member, the thermal management component is then bonded to the first wall through the structural adhesive, and the fixing strength of the thermal management component to the first wall is capable of being enhanced.

In a possible embodiment, the maximum distance from the bent fixing member to the first wall is less than or equal to the maximum distance from the thermal management component to the first wall.

In the embodiment, the maximum distance from the bent fixing member to the first wall is less than or equal to the maximum distance from the thermal management component to the first wall, which can make avoidance for the installation of a plurality of battery cells, thereby being conducive to improving the installation stability of the battery.

In a possible embodiment, the fixing members are distributed at four corners of the first wall, and the fixing members are arranged symmetrically.

In the embodiment, the fixing members are distributed at the four corners of the first wall and arranged symmetrically, which is capable of improving the installation stability of the thermal management component.

In a possible embodiment, the fixing member is fixedly connected to the first wall by spot welding.

In the embodiment, spot welding the fixing member to the first wall can enhance the installation strength between the fixing member and the box body.

In a second aspect, a battery is provided, including a plurality of battery cells, and a box in the first aspect and any possible embodiment thereof, wherein the plurality of battery cells are accommodated in the box.

In a third aspect, an electrical apparatus is provided, including: the battery in the second aspect, the battery being used for providing electric energy for the electrical apparatus.

In a fourth aspect, a method for preparing a battery is provided, including: providing a plurality of battery cells; and providing a box, the box including a box body for accommodating the plurality of battery cells; a fixing member fixedly connected to the box body; and a thermal management component provided with a fitting hole for guiding the fixing member to penetrate through the thermal management component, the thermal management component being used for adjusting temperatures of the plurality of battery cells; wherein the fixing member is configured to penetrate through the fitting hole and bend toward the periphery of the fitting hole, so as to fix the thermal management component to the box body.

In a possible embodiment, the providing the box includes: fixing the fixing member on a first wall of the box body, the first wall being parallel to the thermal management component; penetrating the fixing member through the thermal management component through the fitting hole; and crimping the fixing member to form a blocking portion on the periphery of the fitting hole, the blocking portion being used for fixing the thermal management component to the box body.

In a possible embodiment, before penetrating the fixing member through the thermal management component, the method further includes: performing surface treatment on the first wall to form a protective layer of the thermal management component.

In a possible embodiment, the fixing the fixing member on the first wall of the box body includes: fixing the fixing member on the first wall by spot welding.

In a fifth aspect, an apparatus for preparing a battery is provided, including: a providing module for providing a plurality of battery cells and providing a box, the box including: a box body for accommodating the plurality of battery cells; a fixing member fixedly connected to the box body; and a thermal management component provided with a fitting hole for guiding the fixing member to penetrate through the thermal management component, the thermal management component being used for adjusting temperatures of the plurality of battery cells; wherein the fixing member is configured to penetrate through the fitting hole and bend toward the periphery of the fitting hole, so as to fix the thermal management component to the box body.

DESCRIPTION OF DRAWINGS

To more clearly describe the technical solutions of the embodiments of the present application, the drawings to be used in the embodiments of the present application will be briefly introduced below. Apparently, the drawings described below are merely some embodiments of the present application. For those of ordinary skill in the art, other drawings may also be obtained based on these drawings without making creative efforts.

4

Figure 2:
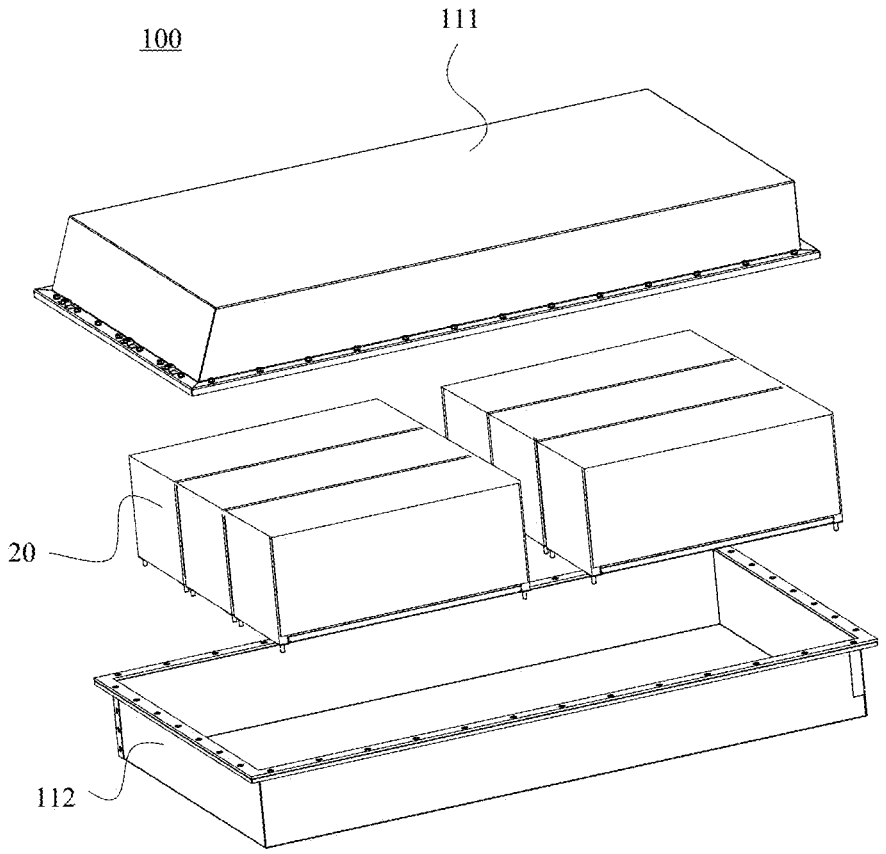

FIG. 2 is a schematic structural diagram of a battery disclosed in an embodiment of the present application.

Figure 3:
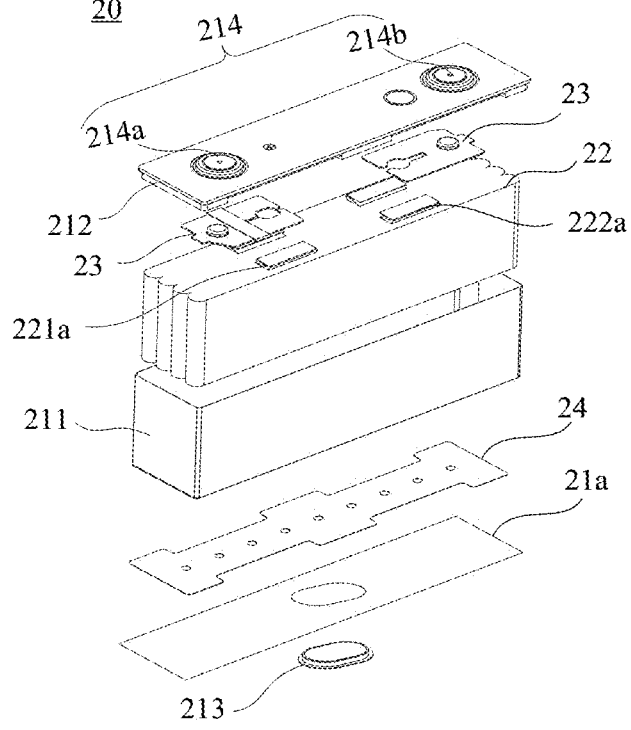

FIG. 3 is a schematic structural diagram of a battery cell disclosed in an embodiment of the present application.

Figure 4:
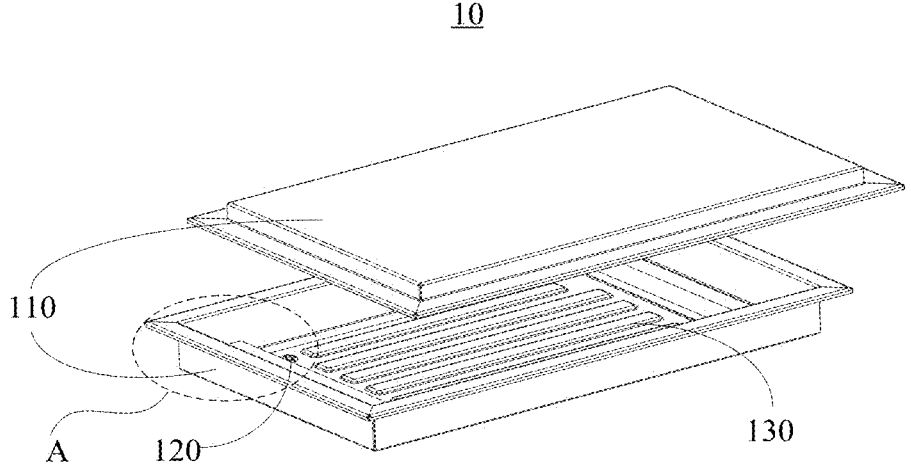

FIG. 4 is a schematic structural diagram of a box disclosed in an embodiment of the present application.

Figure 5:
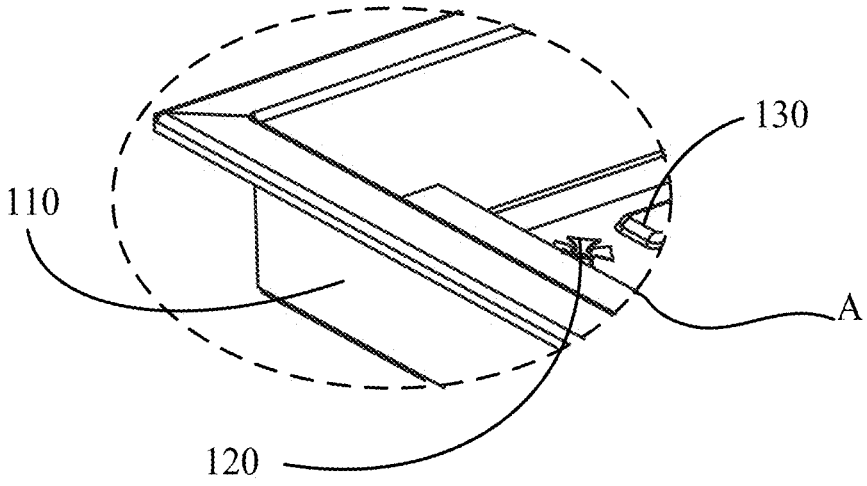

FIG. 5 is a schematic enlarged diagram of a part A in FIG. 4.

Figure 6:
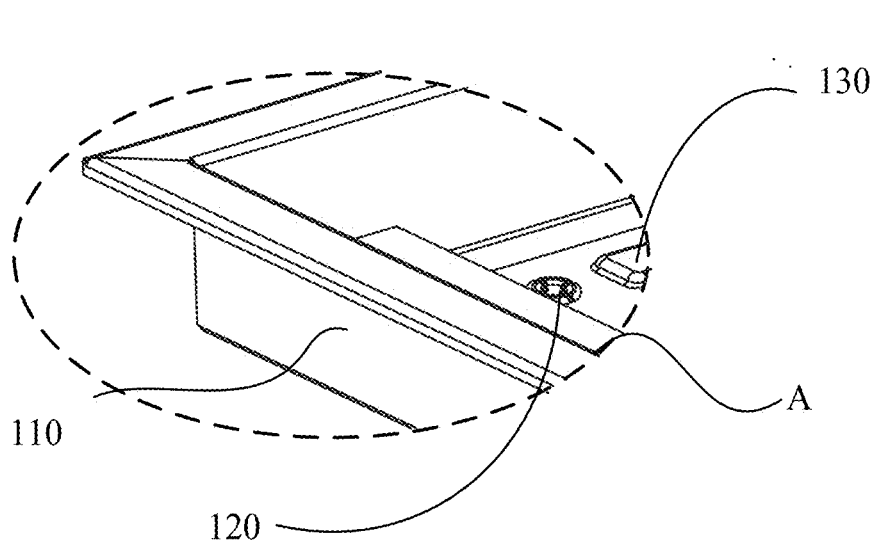

FIG. 6 is another schematic enlarged diagram of the part A in FIG. 4.

Figure 7:
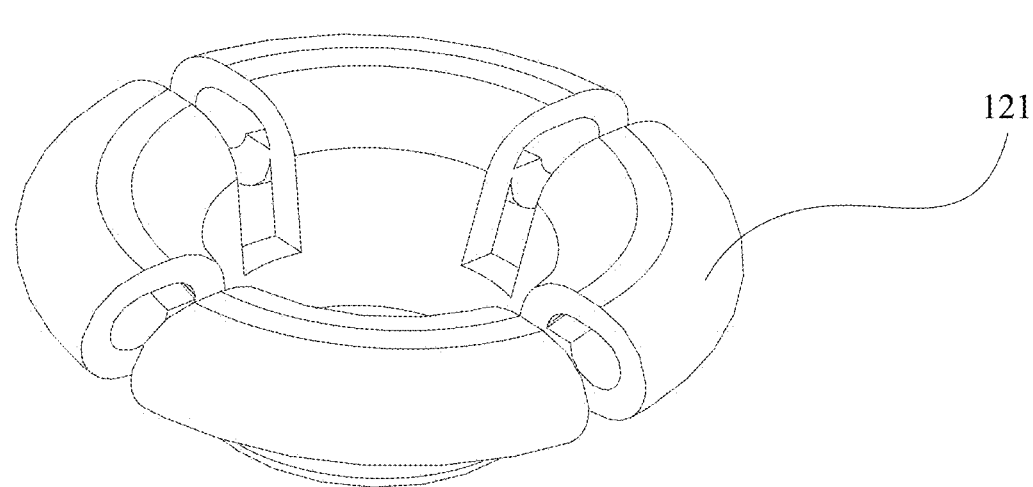

FIG. 7 is a schematic enlarged diagram of a fixing member in FIG. 6.

Figure 8:
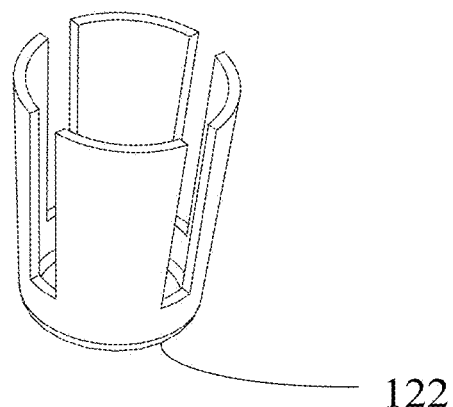

FIG. 8 is a schematic structural diagram of a fixing member according to an embodiment of the present application before being bent.

Figure 9:
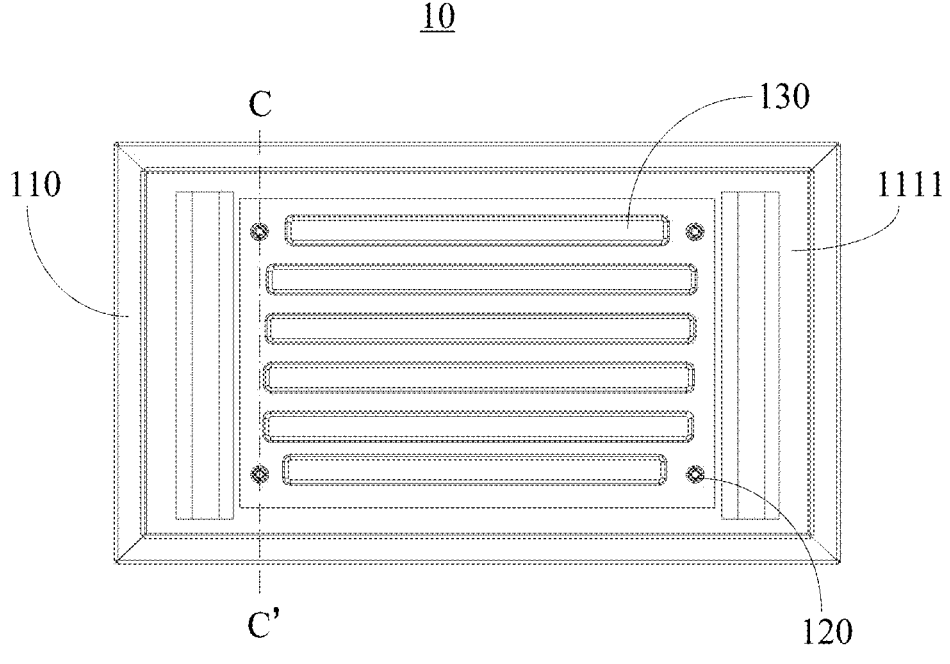

FIG. 9 is a top view of the box shown in FIG. 6.

Figure 10:
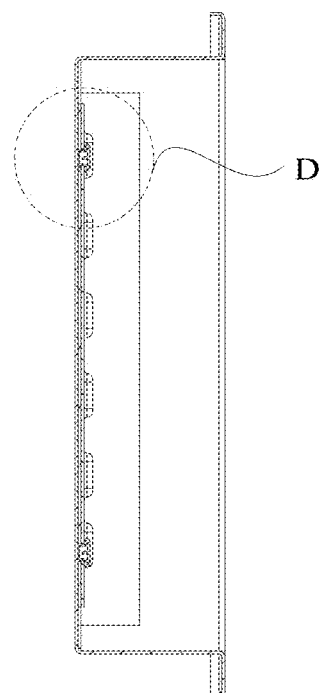

FIG. 10 is a sectional diagram along C-C' in FIG. 9.

Figure 11:
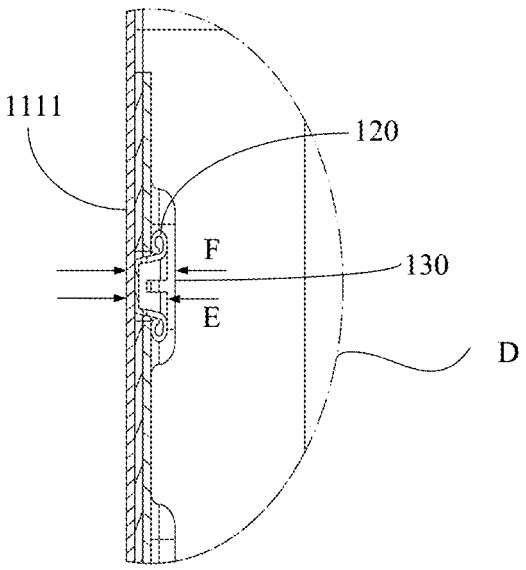

FIG. 11 is a schematic enlarged diagram of a part D in FIG. 10.

Figure 12:
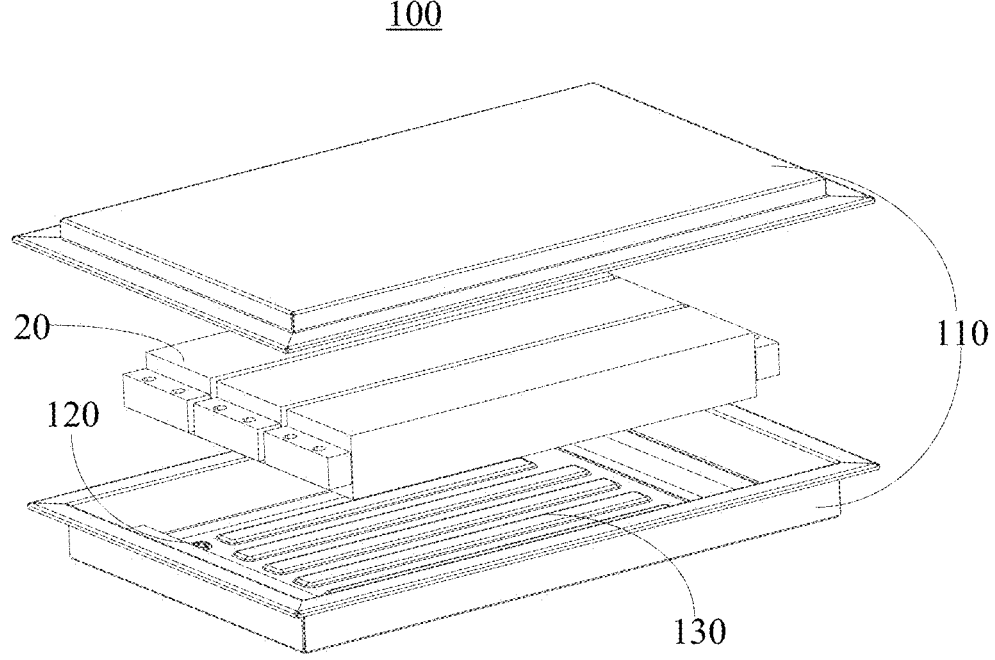

FIG. 12 is a schematic structural diagram of a battery according to an embodiment of the present application.

Figure 13:
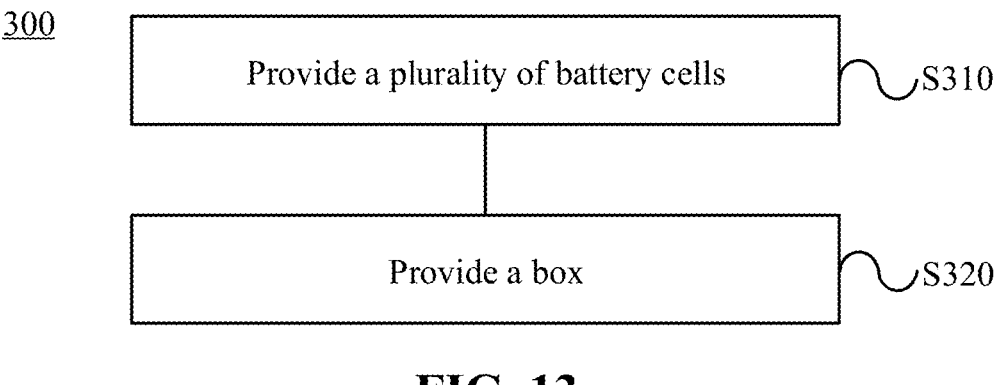

FIG. 13 is a schematic block diagram of a method for preparing a battery according to an embodiment of the present application.

Figure 14:
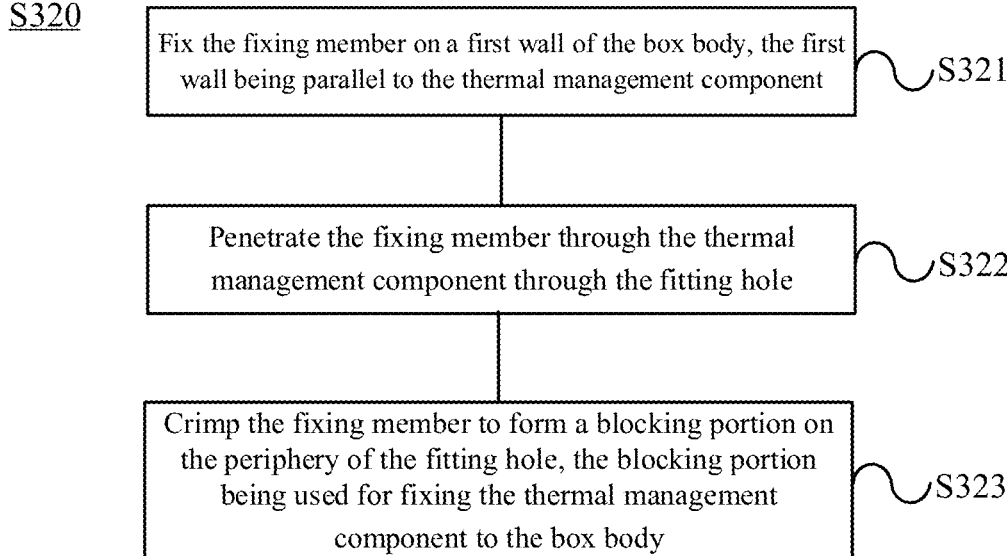

FIG. 14 is a schematic block diagram of another method for preparing a battery according to an embodiment of the present application.

Figure 15:
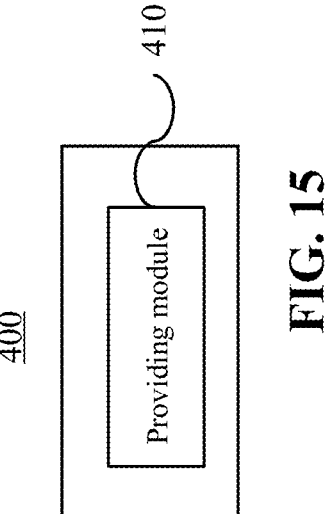

FIG. 15 is a schematic block diagram of an apparatus for preparing a battery according to an embodiment of the present application.

DETAILED DESCRIPTION

For the objects, technical solutions, and advantages of the embodiments of the present application to be clearer, the technical solutions in the embodiments of the present application may be clearly and completely described below with reference to the drawings in the embodiments of the present application, and it is apparent that the described embodiments are a part of the embodiments of the present application rather than all the embodiments. Based on the embodiments of the present application, all other embodiments derived by a person of ordinary skill in the art without any creative effort shall all fall within the protection scope of the present application.

Unless otherwise defined, all technical and scientific terms used in the present application have the same meanings as commonly understood by those skilled in the art of the present application. The terms used in the specification of the present application are only for the purpose of describing specific embodiments, but are not intended to limit the present application. The terms "include/comprise" and "have" and any variations thereof in the specification and claims of the present application and in the description of drawings above are intended to cover non-exclusive inclusion. The terms "first", "second", and the like in the specification and claims of the present application or the above drawings are used to distinguish different objects, rather than used to describe specific orders or primary and secondary relationships.

Orientation words appearing in the following description are all directions shown in the drawings, and do not limit the specific structure of the present application. In the description of the present application, it should also be noted that, unless otherwise expressly specified and defined, the terms "install", "connect", and "connection" should be understood in a broad sense, for example, there may be a fixed connection, a detachable connection, or integral connection; and there may be a direct connection or and indirect connection through an intermediate medium. For those of ordinary skills in the art, the specific meanings of the above terms in the present application may be understood according to specific circumstances.

The reference to "embodiment" in the present application means that specific features, structures or characteristics described with reference to embodiments may be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

In the description of the present application, it should be noted that, unless otherwise expressly specified and defined, the terms "install", "connect", "connection", and "attach" should be understood in a broad sense, for example, there may be a fixed connection, a detachable connection, or integral connection; and there may be a direct connection, an indirect connection through an intermediate medium, or communication inside two elements. For those of ordinary skill in the art, the specific meanings of the above terms in the present application can be understood according to specific situations.

In the description of the embodiments of the present application, the term "and/or" is only an association relationship for describing associated objects, indicating that there may be three relationships, for example, A and/or B may represent three situations: A exists alone, both A and B exist, and B exists alone. In addition, the character "/" in the present application generally means that the associated objects before and after it are in an "or" relationship.

In the present application, "a plurality of" means two or more (including two), similarly, "a plurality of groups" means two or more groups (including two groups), and "a plurality of sheets" means two or more sheets (including two sheets).

In the present application, a battery cell may include a lithium-ion secondary battery, a lithium-ion primary battery, a lithium sulfur battery, a sodium lithium-ion battery, a sodium-ion battery, a magnesium-ion battery, or the like, which will not be limited in the embodiments of the present application. The battery cell may be in a cylindrical shape, a flat shape, a cuboid shape or another shape, which is also not limited in the embodiments of the present application. Battery cells are generally divided into three types according to encapsulating manners: cylindrical battery cells, square battery cells, and pouch cells, which are also not limited in the embodiments of the present application.

The battery mentioned in the embodiments of the present application refers to a single physical module including one or a plurality of battery cells to provide a higher voltage and capacity. For example, the battery mentioned in the present application may include a battery module, a battery pack, or the like. The battery generally includes a box for encapsulating one or a plurality of battery cells. The box can prevent liquid or other foreign matters from affecting charging or discharging of the battery cell.

The battery cell includes an electrode assembly and an electrolytic solution, and the electrode assembly is composed of a positive electrode plate, a negative electrode plate, and a separator. The operation of the battery cell mainly relies on the movement of metal ions between the positive electrode plate and the negative electrode plate. The positive electrode plate includes a positive electrode current collector and a positive electrode active material layer, and the positive electrode active material layer is coated on a surface of the positive electrode current collector. The current collector not coated with the positive electrode active material layer protrudes from the current collector coated with the positive electrode active material layer, and the current collector not coated with the positive electrode active material layer serves as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode plate includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative tab. The material of the negative electrode current collector may be copper, and the negative electrode active material may be carbon, silicon, or the like. In order to ensure that no fusing occurs when a heavy current passes, there are a plurality of positive tabs which are laminated together, and there are a plurality of negative tabs which are laminated together. The material of the separator may be PP, PE, or the like. In addition, the electrode assembly may be of a wound structure or a laminated structure, which is not limited in the embodiments of the present application. With the development of the battery technologies, it is necessary to consider design factors in various aspects, such as energy density, cycle life, discharge capacity, charge-discharge rate, and other performance parameters. In addition, the safety performance of the battery should also be considered.

For the battery cell, the main safety hazards come from charging and discharging processes, as well as appropriate ambient temperature design. In order to effectively avoid unnecessary losses, the battery cell generally has at least three protective measures. Specifically, the protective measures include at least a switching element, selection of an appropriate separator material, and a pressure relief mechanism. A switching element refers to an element that is capable of stopping charging or discharging the battery when the temperature or resistance within the battery cell reaches a certain threshold. The separator is used for separating the positive electrode plate and the negative electrode plate, and can automatically dissolve micron-scale (or even nano-scale) micropores attached thereto when the temperature rises to a certain value, so that metal ions cannot pass through the separator, thereby terminating internal reactions of the battery cell.

The pressure relief mechanism refers to an element or a component that is actuated to relieve an internal pressure or heat when the internal pressure or temperature of the battery cell reaches a predetermined threshold. The threshold design varies according to different design requirements. The threshold may depend on the material of one or a plurality of the positive electrode plate, the negative electrode plate, the electrolyte solution, and the separator in the battery cell. The pressure relief mechanism may take the form of an explosion-proof valve, a gas valve, a pressure relief valve, a safety valve, or the like, and may specifically adopt a pressure-sensitive or temperature-sensitive element or structure. That is, when the internal pressure or temperature of the battery cell reaches a predetermined threshold, the pressure relief mechanism performs an action or a weak structure arranged in the pressure relief mechanism is damaged, so as to form an opening or channel for releasing the internal pressure or temperature.

The "actuate" mentioned in the present application means that the pressure relief mechanism performs an action or is activated to a certain state, so that the internal pressure and temperature of the battery cell can be relieved. The action performed by the pressure relief mechanism may include, but is not limited to: at least part of the pressure relief mechanism being broken, crushed, torn, opened, or the like. When the pressure relief mechanism is actuated, high-temperature and high-pressure substances inside the battery cell are discharged as emissions outwards from the actuated part. In this manner, it is capable of enabling the battery cell to undergo pressure relief under a controllable pressure or temperature, thereby avoiding the occurrence of potential more serious accidents.

The emissions from the battery cell mentioned in the present application include, but are not limited to, an electrolyte solution, dissolved or split positive and negative electrode plates, separator fragments, high-temperature and high-pressure gases generated from reactions, flames, and the like.

The pressure relief mechanism on the battery cell has an important impact on the safety performance of the battery. For example, when short circuit, overcharge, and the like occur, thermal runaway may occur inside the battery cell and the pressure may rise suddenly. In this case, the internal pressure and temperature can be released outward through the actuation of the pressure relief mechanism to prevent explosion and fire of the battery cell.

In the current design solutions of the pressure relief mechanism, the main concern is to release the high pressure and high heat from the interior of the battery cell, that is, to discharge emissions to the exterior of the battery cell. However, in order to ensure the output voltage or current of the battery, a plurality of battery cells are often required and the plurality of battery cells are electrically connected through a bus component. Emissions discharged from the interior of a battery cell may cause short circuits in other battery cells. For example, when discharged metal shavings electrically connect two bus components, it may cause a short circuit in the battery, thereby having a safety hazard. Furthermore, the high-temperature and high-pressure emissions are discharged in a direction where the pressure relief mechanism is arranged in the battery cell, and may be more specifically discharged in a direction toward a region where the pressure relief mechanism is actuated. Such emissions may be very powerful and destructive, and may even be enough to breach one or a plurality of structures in the direction, causing further safety concerns.

Therefore, a thermal management component is usually arranged inside the battery to adjust the temperature of the battery cell. Specifically, the thermal management component is used for accommodating a fluid to adjust the temperature of the battery cell. The fluid herein may be a liquid or gas, and the temperature adjustment refers to heating or cooling the plurality of battery cells. In a case of cooling or lowering the temperature of the battery cells, the thermal management component is used for accommodating a cooling fluid to lower the temperatures of the plurality of battery cells. In this case, the thermal management component may also be referred to as a cooling component, a cooling system, a cooling plate, or the like, and the fluid accommodated therein may also be referred to as a cooling medium or a cooling fluid, and more specifically, may be referred to as a cooling liquid or a cooling gas. In addition, the thermal management component may also be used for heating to raise the temperatures of the plurality of battery cells, which will not be limited in the embodiments of the present application. Optionally, the fluid may flow in a circulating manner to achieve a better temperature adjustment effect. Optionally, the fluid may be water, a mixture of water and ethylene glycol, air, or the like.

Most of the current thermal management components are arranged inside the battery in a sandwiched manner. Specifically, the thermal management component is arranged between a wall of the box of the battery and a steel plate, and a cavity is formed by welding between the wall of the box and the steel plate to accommodate the thermal management component. However, welding may affect the surface treatment of the thermal management component, thereby causing the thermal management component fixed in a sandwiched manner to be susceptible to corrosion.

In view of this, the embodiments of the present application provide a technical solution. The thermal management component can be fixedly connected to the box body through the bending of the fixing member. This fixing method is simple and easy to implement, and does not damage the surface treatment of the thermal management component, thereby avoiding corrosion of thermal management component.

The technical solutions described in the embodiments of the present application are all applicable to various apparatuses using batteries, such as mobile phones, portable devices, laptops, battery vehicles, electric toys, electric tools, electric vehicles, ships, spacecrafts, and the like. For example, the spacecrafts include airplanes, rockets, space shuttles, spaceships, and the like.

It should be understood that the technical solutions described in the examples of the present application are not only applicable to the devices described above, but also applicable to all devices using batteries. However, for the sake of brevity, the following embodiments are described by taking an electric vehicle as an example.

Figure 1:
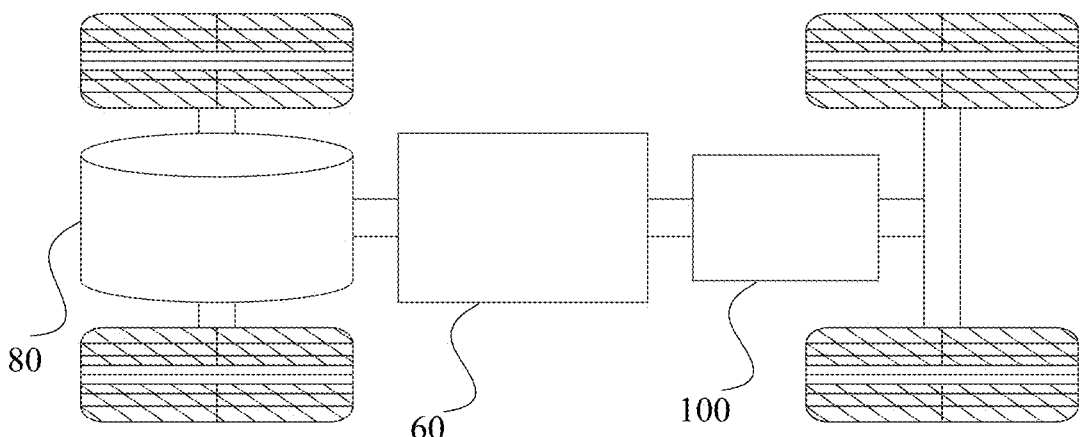
FIG. 1 is a schematic structural diagram of a vehicle disclosed in an embodiment of the present application.

For example, as shown in FIG. 1, a schematic structural diagram of a vehicle 1 according to an embodiment of the present application is shown. The vehicle 1 may be a fuel vehicle, a gas vehicle, or a new energy vehicle, and the new energy vehicle may be an all-electric vehicle, a hybrid vehicle, an extended range electric vehicle, or the like. A motor 80, a controller 60, and a battery 100 may be arranged inside the vehicle 1, and the controller 60 is used for controlling the battery 100 to supply power to the motor 80. As an example, the battery 100 may be arranged at the bottom or the head or the tail of the vehicle 1. The battery 100 may be used for supplying power to the vehicle 1. For example, the battery 100 may be used as an operating power source of the vehicle 1, which is used for a circuit system of the vehicle 1, for example, for operation power requirements of the vehicle 1 during starting, navigation, and running. In another embodiment of the present application, the battery 100 can serve not only as an operating power supply for the vehicle 1, but also as a driving power source for the vehicle 1, so as to replace or partially replace fuel or natural air to provide driving power for the vehicle 1.

In order to meet different power requirements, the battery may include a plurality of battery cells, wherein the plurality of battery cells may be in series connection, parallel connection, or parallel-series connection. The parallel-series connection refers to a combination of a series connection and a parallel connection. The battery may also be referred to as a battery pack. Optionally, first, a plurality of battery cells may be in series connection, parallel connection, or parallel-series connection to form a battery module, and then, a plurality of battery modules may be in series connection, parallel connection, or parallel-series connection to form a battery. In other words, the plurality of battery cells may directly form a battery, or may first form battery modules, and then, the battery modules form a battery.

For example, as shown in FIG. 2, a schematic structural diagram of a battery 100 according to an embodiment of the present application is shown. The battery 100 may include a plurality of battery cells 20. The battery 100 may further include a box (or a enclosure), the interior of the box is a hollow structure, and the plurality of battery cells 20 are accommodated in the box. As shown in FIG. 2, the box may include two parts, which are referred to as a first part 111 and a second part 112 respectively, and the first part 111 and the second part 112 are fastened together. The shapes of the first part 111 and the second part 112 may be determined according to the combined shape of the plurality of battery cells 20, and the first part 111 and the second part 112 may each have an opening. For example, both the first part 111 and the second part 112 may be hollow rectangular solids and each have only one surface being an open surface, the opening of the first part 111 and the opening of the second part 112 are arranged opposite to each other, and the first part 111 and the second part 112 are fastened to each other to form the box having a closed chamber. The plurality of battery cells 20 are assembled by parallel connection, series connection, or parallel-series connection, and then placed in the box formed by fastening the first part 111 with the second part 112 together.

Optionally, the battery 100 may further include other structures, which will not be repeated here. For example, the battery 100 may further include a bus component, and the bus component is used for achieving electrical connection between the plurality of battery cells 20, such as parallel connection, series connection, or parallel-series connection. Specifically, the bus component may realize electrical connections between the battery cells 20 by connecting electrode terminals of the battery cells 20. Further, the bus component may be fixed to the electrode terminal of the battery cell 20 by welding. The electric energy of the plurality of battery cells 20 may be further led out through a conductive mechanism penetrating through the box. Optionally, the conductive mechanism may also belong to the bus component.

According to different power requirements, the quantity of the battery cells 20 may be set to any value. The plurality of battery cells 20 may be in series connection, parallel connection, or parallel-series connection to achieve a larger capacity or power. Each battery 100 may include a large quantity of battery cells 20, and therefore, in order to facilitate installation, the battery cells 20 may be arranged in groups, and each group of battery cells 20 forms a battery module. The quantity of battery cells 20 included in the battery module is not limited and may be set according to the requirements.

For example, as shown in FIG. 3, a schematic structural diagram of a battery cell 20 according to an embodiment of the present application is shown. The battery cell 20 includes one or a plurality of electrode assemblies 22, a case 211, and a cover plate 212. Walls of the case 211 and the cover plate 212 are both referred to as walls of the battery cell 20. The shape of the case 211 is determined according to the combined shape of one or more electrode assemblies 22. For example, the case 211 may be a hollow cuboid, cube, or cylinder, and one of the surfaces of the case 211 has an opening to facilitate placing the one or plurality of electrode assemblies 22 in the case 211. For example, when the case 211 is a hollow cuboid or cube, one of the planes of the case 211 is an opening surface, that is, the plane has no walls so that the interior and exterior of the case 211 are in communication with each other. When the case 211 is a hollow cylinder, an end surface of the case 211 is an opening surface, that is, this end surface does not have a wall so that the interior and the exterior of the case 211 are in communication with each other. The cover plate 212 covers the opening and is connected to the case 211 to form an enclosed cavity in which the electrode assemblies 22 are placed. The case 211 is filled with an electrolyte, such as the electrolyte solution.

The battery cell 20 may further include two electrode terminals 214, and the two electrode terminals 214 may be arranged on the cover plate 212. The cover plate 212 is generally in the shape of a flat plate, and the two electrode terminals 214 are fixed to the flat plate surface of the cover plate 212. The two electrode terminals 214 are a positive electrode terminal 214a and a negative electrode terminal 214b respectively. Each of the electrode terminals 214 is correspondingly provided with a connecting member 23, which may alternatively be referred to as a current collecting member 23, located between the cover plate 212 and the electrode assembly 22 for implementing electrical connection of the electrode assembly 22 and the electrode terminal 214.

As shown in FIG. 3, each of the electrode assemblies 22 has a first tab 221a and a second tab 222a. The first tab 221a and the second tab 222a have opposite polarities. For example, when the first tab 221a is a positive tab, the second tab 222a is a negative tab. The first tab 221a of one or a plurality of electrode assemblies 22 is connected to one electrode terminal via one connecting member 23, and the second tab 222a of the one or a plurality of electrode assemblies 22 is connected to the other electrode terminal via the other connecting member 23. For example, the positive electrode terminal 214a is connected to the positive tab via one connecting member 23, and the negative electrode terminal 214b is connected to the negative tab via the other connecting member 23.

In the battery cell 20, a single or a plurality of electrode assemblies 22 may be arranged according to actual usage requirements. As shown in FIG. 3, 4 independent electrode assemblies 22 are arranged in the battery cell 20.

For example, a pressure relief mechanism 213 may be arranged on one wall of the battery cell 20, such as the first wall 21a shown in FIG. 3. For ease of illustration, the first wall 21a is separated from the case 211 in FIG. 3, but this does not limit the bottom side of the case 211 to have an opening. The pressure relief mechanism 213 is used for relieving the internal pressure or temperature when the internal pressure or temperature of the battery cell 20 reaches a threshold.

The pressure relief mechanism 213 may be a part of the first wall 21a, or may be of a split structure from the first wall 21a so as to be fixed to the first wall 21a by means of, for example, welding. When the pressure relief mechanism 213 is a part of the first wall 21a, for example, the pressure relief mechanism 213 may be formed by providing an indentation in the first wall 21a, with the thickness of the first wall 21a corresponding to the indentation being less than the thickness of other regions of the pressure relief mechanism 213 except at the indentation. The indentation is the weakest position of the pressure relief mechanism 213.

When excessive gas generated by the battery cell 20 causes the internal pressure in the case 211 to rise and reach a threshold, or the internal temperature of the battery cell 20 rises and reaches a threshold due to the heat generated by the internal reaction of the battery cell 20, the pressure relief mechanism 213 can be fractured at the indentation, resulting in the communication between the interior and exterior of the case 211. The gas pressure and the temperature are released outward through the fracture of the pressure relief mechanism 213, thereby preventing the battery cell 20 from exploding.

Optionally, in one embodiment of the present application, as shown in FIG. 3, when the pressure relief mechanism 213 is arranged on the first wall 21*a* of the battery cell 20, an electrode terminal 214 is arranged on another wall of the battery cell 20, the other wall is different from the first wall 21*a*.

Optionally, the wall on which the electrode terminal 214 is arranged is arranged opposite to the first wall 21*a*. For example, the first wall 21*a* may be the bottom wall of the battery cell 20, and the wall on which the electrode terminal 214 is arranged may be the top wall of the battery cell 20, that is, the cover plate 212.

Optionally, as shown in FIG. 3, the battery cell 20 may also include a padding plate 24, and the padding plate 24 is located between the electrode assembly 22 and the bottom wall of the case 211, can support the electrode assembly 22, and can also effectively prevent the electrode assembly 22 from interfering with rounded corners around the bottom wall of the case 211. In addition, the padding plate 24 may be provided with one or a plurality of through holes. For example, a plurality of evenly arranged through holes may be arranged. Alternatively, when the pressure relief mechanism 213 is arranged on the bottom wall of the case 211, a through hole may be arranged at a position corresponding to the pressure relief mechanism 213, so as to facilitate liquid conduction and gas conduction. Specifically, this allows the space on the upper surface of the padding plate 24 is in communication with the space on the lower surface thereof, so that the gas generated inside the battery cell 20 and the electrolyte solution are capable of passing through the padding plate 24 freely.

By arranging the pressure relief mechanism 213 and the electrode terminal 214 on different walls of the battery cell 20, when the pressure relief mechanism 213 is actuated, the emissions from the battery cell 20 are further away from the electrode terminal 214, thereby reducing the impact of the emissions on the electrode terminal 214, thereby being capable of enhancing the safety performance of the battery.

Further, when the electrode terminal 214 is arranged on the cover plate 212 of the battery cell 20, the pressure relief mechanism 213 is arranged on the bottom wall of the battery cell 20, so that when the pressure relief mechanism 213 is actuated, the emissions of the battery cell 20 are discharged to the bottom of the battery 100. In this way, on the one hand, the thermal management component and the like at the bottom of the battery 100 can be used to reduce the risk of emissions, and on the other hand, the bottom of the battery 100 is usually far away from a user, thereby reducing the harm to the user.

The pressure relief mechanism 213 may have various possible pressure relief structures, which is not limited in the embodiments of the present application. For example, the pressure relief mechanism 213 may be a temperature-sensitive pressure relief mechanism, and the temperature-sensitive pressure relief mechanism is configured to be capable of being melt when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being ruptured when the internal air pressure of the battery cell 20 provided with the pressure relief mechanism 213 reaches a threshold.

FIG. 4 shows a schematic structural diagram of a box 10 according to an embodiment of the present application. FIG. 5 is a schematic enlarged diagram of a part A in FIG. 4. As shown in FIG. 4 and FIG. 5, the box 10 includes a box body 110 for accommodating a plurality of battery cells; a fixing member 120 fixedly connected to the box body 110; and a thermal management component 130 provided with a fitting hole for guiding the fixing member 120 to penetrate through the thermal management component 130, the thermal management component 130 being used for adjusting temperatures of the plurality of battery cells; wherein the fixing member 120 is configured to penetrate through the fitting hole and bend toward the periphery of the fitting hole, so as to fix the thermal management component 130 to the box body 110.

As shown in FIG. 4, the box body 110 may include an upper box and a lower box. In an example, the upper box and the lower box may be the first part 111 and the second part 112 as shown in FIG. 2, both the first part 111 and the second part 112 may be hollow rectangular solids and each have only one surface being an open surface, the opening of the first part 111 and the opening of the second part 112 are arranged opposite to each other, and the first part 111 and the second part 112 are fastened to each other to form the box body 110 having a closed chamber.

In another example, the lower box may be a hollow rectangular solid with one surface open, while the upper box may be a cover plate, and the upper box covers the open surface of the lower box, thereby forming the box body 110 having a closed chamber.

It should be noted that the shape of the box body 110 may be determined according to the shape of a combination of a plurality of battery cells, which is not limited in the embodiment of the present application.

Optionally, in the embodiment of the present application, the fixing member 120 may be fixed on any wall of the box body 110. For example, the fixing member 120 may be fixed on the bottom wall of the box body 110 or any two side walls of the box body 110 arranged opposite to each other.

As shown above, the thermal management component 130 may accommodate a fluid to adjust the temperature of a plurality of battery cells. Specifically, the thermal management component 130 may be provided with a flow channel for accommodating the fluid. For example, the thermal management component 130 is formed by a first metal plate having a plurality of grooves and a second metal plate in a flat shape. The second metal plate covers the plurality of grooves on the first metal plate to form a plurality of flow channels with cavities.

The thermal management component 130 is provided with a fitting hole, and the shape of the fitting hole may be determined according to the shape of the bottom surface of the fixing member 120. For example, if the bottom surface of the fixing member 120 is circular, the shape of the fitting hole is also circular. For another example, if the bottom surface of the fixing member 120 is square, the shape of the fitting hole is also square. However, those skilled in the art should understand that the shape of the fitting hole and the shape of the bottom surface of the fixing member 120 may also be different. For example, the shape of the fitting hole is square, the shape of the bottom surface of the fixing member 120 is circular, and the side length of the square is slightly larger than the diameter of the circle, so that the fixing member 120 can penetrate through the fitting hole.

Optionally, the fixing member 120 may be a hollow structure with an opening before being bent. Taking the bottom surface of the fixing member 120 being circular as an example, the bottom surface of the fixing member 120 is fixed on the box body 110, and the opening is arranged opposite to the bottom surface. The side of the fixing member 120 may be divided into a plurality of sub-sides. After the fixing member 120 penetrates through the fitting hole of the thermal management component 130, the plurality of sub-sides of the fixing member 120 may be bent in directions away from the central axis of the fixing member 120 respectively, so as to fix the thermal management component 130 to the box body 110.

Therefore, in the box 10 provided by the embodiment of the present application, the thermal management component 130 can be fixed to the box body 110 by simply deforming the structure of the fixing member 120. This fixing method is simple and easy to implement, and does not damage the surface treatment of the thermal management component 130, thereby preventing the thermal management component 130 from being corroded.

FIG. 6 is another schematic enlarged diagram of a part A in FIG. 4. FIG. 7 is a schematic enlarged diagram of a fixing member 120 in FIG. 6. As shown in FIG. 6 and FIG. 7, the box 10 includes a box body 110 for accommodating a plurality of battery cells; a fixing member 120 fixedly connected to the box body 110; and a thermal management component 130 provided with a fitting hole for guiding the fixing member 120 to penetrate through the thermal management component 130, the thermal management component 130 being used for adjusting temperatures of the plurality of battery cells; wherein the fixing member 120 is configured to be capable of being crimped to form a blocking portion 121 at the periphery of the fitting hole, and the blocking portion 121 is used for fixing the thermal management component 130 to the box body 110.

In other words, the thermal management component 130 may be defined between the blocking portion 121 and one wall of the box body 110. Optionally, the bottom of the blocking portion 121 may be in close contact with the thermal management component 130.

Optionally, the cross section of the blocking portion 121 may be circular as shown in FIG. 7, or may be a square, triangular, or another shape. In the embodiment of the present application, the structure of the blocking portion 121 formed by the crimped fixing member 120 is not limited.

It should be noted that the side of the fixing member 120 in FIG. 7 is divided into 4 sub-sides, and may also be divided into other quantity of sub-sides. The greater the quantity of sub-sides is, the easier it is for the fixing member 120 to be crimped.

In the embodiment, the blocking portion 121 is formed by crimping the fixing member 120, so that the thermal management component 130 is defined between the blocking portion 121 and a wall of the box body 110, and the existence of the blocking portion 121 is capable of limiting the movement of the thermal management component 130 in a direction away from one wall of the box body 110, so that the thermal management component 130 is capable of being fixed on the box body 110.

FIG. 8 is a schematic structural diagram of a fixing member 120 before being bent. As shown in FIG. 8, the diameter of the fixing member 120 gradually becomes larger in a direction away from the connection between the fixing member 120 and the box body 110. In other words, in the direction away from a bottom surface 122 of the fixing member 120, the diameter of the fixing member 120 gradually becomes larger, that is, the opening of the fixing member 120 is in the shape of a bell mouth.

Optionally, the fixing member 120 may have a certain degree of flexibility, and the size of the fitting hole of the thermal management component 130 may be slightly larger than the size of the bottom surface 122 of the fixing member 120. Before the fixing member 120 penetrates through the fitting hole of the thermal management component 130, the opening of the fixing member 120 is gathered toward the central axis, so that the size of the opening of the fixing member 120 is slightly smaller than the size of the fitting hole, so that the fixing member 120 is capable of penetrating through the fitting hole of the thermal management component 130.

In the embodiment, before the fixing member 120 is bent, the opening of the fixing member 120 is in the shape of a bell mouth, which is more conducive to the crimping process of the fixing member 120, and the blocking portion 121 formed after crimping is capable of better fixing the thermal management component 130 on the box body.

Optionally, as shown in FIG. 9, the fixing member 120 is fixed to a first wall 1111 of the box body 110, the first wall 1111 is parallel to the thermal management component 130, and the fixing member 120 is used for fixing the thermal management component 130 to the first wall 1111.

In the embodiment, the thermal management component 130 is fixed on the first wall 1111 of the box body 110 parallel to the thermal management component 130, which is capable of reducing modifications to the thermal management component 130 and is capable of reducing the assembling complexity of the thermal management component 130.

Optionally, as shown in FIG. 9, the fixing members 120 are distributed at four corners of the first wall 1111, and the fixing members 120 are arranged symmetrically.

In the embodiment, the fixing members 120 are distributed at the four corners of the first wall 1111 and arranged symmetrically, which is capable of improving the installation stability of the thermal management component 130.

In other examples, the quantity of the fixing members 120 may also be 3, and the 3 fixing members 120 may be distributed in an equilateral triangle. Those skilled in the art should understand that the quantity and position of the fixing members 120 are not specifically limited in the embodiment of the present application, as long as the thermal management component 130 is capable of being fixed to the box body 110.

In another embodiment, the fixing member 120 may also be fixed on a second wall of the box body 110, and the second wall may be perpendicular to the thermal management component 130. For example, two fixing members 120 may be arranged respectively on two opposite second walls, and a plane formed by the four fixing members 120 is parallel to the thermal management component 130. Both ends of the thermal management component 130 close to the second walls are bent to form bending portions, and fitting holes corresponding to the four fixing members 120 are respectively arranged on the bending portions at both ends. The fitting holes are used for guiding the fixing members 120 to penetrate through the thermal management component 130.

Optionally, in the embodiment, a non-bent portion of the thermal management component 130 may fit the first wall 1111 of the box body 110.

Optionally, in the embodiment of the present application, the thermal management component 130 is also bonded to the first wall 1111 through a structural adhesive.

In the embodiment, on the basis of fixing the thermal management component 130 to the first wall 1111 through the fixing member 120, the thermal management component 130 is then bonded to the first wall 1111 through the structural adhesive, and the fixing strength of the thermal management component 130 to the first wall 1111 is capable of being enhanced.

FIG. 10 is a schematic sectional diagram of the box 10 along C-C' in FIG. 9. FIG. 11 is a schematic enlarged diagram of a part D in FIG. 10. Optionally, as shown in FIG. 11, the maximum distance E from the bent fixing member 120 to the first wall 1111 is less than or equal to the maximum distance from the thermal management component 130 to the first wall 1111.

What needs to be explained here is that since the first wall 1111 is a plane, the bent fixing member 120 may be regarded as composed of a plurality of points. The maximum distance E from the bent fixing member 120 to the first wall 1111 is the maximum distance among the distances from the plurality of points forming the bent fixing member 120 to the first wall 1111. Similarly, the thermal management component 130 may also be regarded as composed of a plurality of points. The maximum distance F from the thermal management component 130 to the first wall 1111 is the maximum distance among the distances from the plurality of points forming the thermal management component 130 to the first wall 1111.

In the embodiment, the maximum distance E from the bent fixing member 120 to the first wall 1111 is less than or equal to the maximum distance F from the thermal management component 130 to the first wall 1111, which can make avoidance for the installation of a plurality of battery cells, thereby being conducive to improving the installation stability of the battery.

Optionally, in the embodiment of the present application, the fixing member 120 is fixedly connected to the first wall 1111 by spot welding.

In the embodiment, spot welding the fixing member 120 to the first wall 1111 can enhance the installation strength between the fixing member 120 and the box body 110.

Optionally, the embodiment of the present application further provides a battery 100. The battery 100 includes a box 10 and a plurality of battery cells 20. The plurality of battery cells 20 are accommodated in the box 10.

Optionally, the box 10 may be the box 10 described in any of the above embodiments. As shown in FIG. 12, the battery 100 includes a plurality of battery cells 20; and a box 10 for accommodating the plurality of battery cell 20. The box 10 includes a box body 110; a fixing member 120 fixedly connected to the box body 110; and a thermal management component 130 provided with a fitting hole for guiding the fixing member 120 to penetrate through the thermal management component 130, the thermal management component 130 being used for adjusting temperatures of the plurality of battery cells; wherein the fixing member 120 is configured to penetrate through the fitting hole and bend toward the periphery of the fitting hole, so as to fix the thermal management component 130 to the box body 110.

Optionally, the structure of the battery cell 20 may be obtained with reference to the structure of the battery cell 20 shown in FIG. 3, which will not be described again here for the sake of simplicity.

An embodiment of the present application further provides an electrical apparatus, the electrical apparatus may include the battery 100 in the above embodiments, and the battery 100 is used for providing electric energy to the electrical apparatus.

Optionally, the electrical apparatus may be the vehicle 1, a ship, or a spacecraft.

The battery and the electrical apparatus of the embodiments of the present application are described above, and the method and apparatus for preparing a battery of the embodiments of the present application will be described below. For the parts not described in detail, reference may be made to the foregoing embodiments.

FIG. 13 is a schematic flow chart of a method 300 for preparing a battery according to an embodiment of the present application. The battery may be the battery 100 provided in the various embodiments described above. As shown in FIG. 13, the method 300 may include:

S310: providing a plurality of battery cells 20; and

S320: providing a box 10.

The box 10 includes a box body 110 for accommodating the plurality of battery cells 20; a fixing member 120 fixedly connected to the box body 110; and a thermal management component 130 provided with a fitting hole for guiding the fixing member 120 to penetrate through the thermal management component 130, the thermal management component 130 being used for adjusting temperatures of the plurality of battery cells 20; wherein the fixing member 120 is configured to penetrate through the fitting hole and bend toward the periphery of the fitting hole, so as to fix the thermal management component 130 to the box body 110.

Optionally, as shown in FIG. 14, in S320, providing the box 10 includes:

S321: Fixing the fixing member 120 on a first wall 1111 of the box body 110, the first wall 1111 being parallel to the thermal management component 130;

S322: Penetrating the fixing member 120 through the thermal management component 130 through the fitting hole; and S323: Crimping the fixing member 120 to form a blocking portion 121 on the periphery of the fitting hole, the blocking portion 121 being used for fixing the thermal management component 130 to the box body 110.

Optionally, in the embodiment of the present application, before penetrating the fixing member 120 through the thermal management component 130, the method 300 further includes: performing surface treatment on the first wall to form a protective layer of the thermal management component.

Optionally, in the embodiment of the present application, the fixing the fixing member 120 on the first wall 1111 of the box body 110 includes: fixing the fixing member 120 on the first wall 1111 by spot welding.

FIG. 15 is a schematic block diagram of an apparatus 400 for preparing a battery according to an embodiment of the present application. The battery may be the battery 100 provided in the various embodiments described above. As shown in FIG. 15, the apparatus 400 for preparing a battery may include: a providing module 410.

The providing module 410 is used for: providing a plurality of battery cells 20; and providing a box 10, wherein the box 10 includes a box body 110 for accommodating the plurality of battery cells 20; a fixing member 120 fixedly connected to the box body 110; and a thermal management component 130 provided with a fitting hole for guiding the fixing member 120 to penetrate through the thermal management component 130, the thermal management component 130 being used for adjusting temperatures of the plurality of battery cells 20; wherein the fixing member 120 is configured to penetrate through the fitting hole and bend toward the periphery of the fitting hole, so as to fix the thermal management component 130 to the box body 110.

Although the present application has been described with reference to the preferred embodiments, various improvements may be made thereto and components thereof may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A box, comprising:
a box body used for accommodating a plurality of battery cells;
a fixing member fixedly connected to the box body; and
a thermal management component provided with a fitting hole for guiding the fixing member to penetrate through the thermal management component, the thermal management component being used for adjusting temperatures of the plurality of battery cells;
wherein the fixing member is configured to penetrate through the fitting hole and bend toward the periphery of the fitting hole to fix the thermal management component to the box body;
the fixing member is configured to be capable of being crimped to form a blocking portion at the periphery of the fitting hole, and the blocking portion is used for fixing the thermal management component to the box body;
before the fixing member is crimped, the diameter of the fixing member gradually becomes larger in a direction away from a connection between the fixing member and the box body.

2. The box according to claim 1, wherein the fixing member is fixed to a first wall of the box body, the first wall is parallel to the thermal management component, and the fixing member is used for fixing the thermal management component to the first wall.

3. The box according to claim 2, wherein the thermal management component is further bonded to the first wall through a structural adhesive.

4. The box according to claim 2, wherein the maximum distance from the bent fixing member to the first wall is less than or equal to the maximum distance from the thermal management component to the first wall.

5. The box according to claim 2, wherein the fixing members are distributed at four corners of the first wall, and the fixing members are symmetrically arranged.

6. The box according to claim 2, wherein the fixing member is fixedly connected to the first wall by spot welding.

7. A battery, comprising:
the box according to claim 1; and
a plurality of battery cells accommodated in the box.

8. An electrical apparatus, comprising the battery according to claim 7, the battery being used for providing electrical energy for the electrical apparatus.

9. A method for preparing a battery, comprising:
providing (S310) a plurality of battery cells; and
providing (S320) a box, wherein the box comprises:
a box body used for accommodating the plurality of battery cells;
a fixing member fixedly connected to the box body; and
a thermal management component provided with a fitting hole for guiding the fixing member to penetrate through the thermal management component, the thermal management component being used for adjusting temperatures of the plurality of battery cells;
wherein the fixing member is configured to penetrate through the fitting hole and bend toward the periphery of the fitting hole to fix the thermal management component to the box body;
the fixing member is configured to be capable of being crimped to form a blocking portion at the periphery of the fitting hole, and the blocking portion is used for fixing the thermal management component to the box body;
before the fixing member is crimped, the diameter of the fixing member gradually becomes larger in a direction away from a connection between the fixing member and the box body.

10. The method according to claim 9, wherein the providing a box comprises:
fixing (S321) the fixing member on a first wall of the box body, the first wall being parallel to the thermal management component;
penetrating (S322) the fixing member through the thermal management component through the fitting hole; and
crimping (S323) the fixing member to form a blocking portion on the periphery of the fitting hole, the blocking portion being used for fixing the thermal management component to the box body.

11. The method according to claim 10, wherein before penetrating the fixing member through the thermal management component, the method further comprises:
performing surface treatment on the first wall to form a protective layer of the thermal management component.

12. The method according to claim 10, wherein the fixing the fixing member on a first wall of the box body comprises:
fixing the fixing member on the first wall by spot welding.

* * * * *